United States Patent [19]
Pasquale et al.

[11] Patent Number: 5,985,238
[45] Date of Patent: Nov. 16, 1999

[54] PROCESS FOR PREPARING FERRIERITE

[75] Inventors: Gary Michael Pasquale, Lansdale, Pa.; Brendan Dermot Murray, Houston, Tex.

[73] Assignee: PQ Corporation, Berwyn, Pa.

[21] Appl. No.: 08/885,628

[22] Filed: Jun. 30, 1997

Related U.S. Application Data

[63] Continuation of application No. 08/782,858, Jan. 13, 1997, abandoned, which is a continuation of application No. 08/481,724, Jun. 7, 1995, abandoned.

[51] Int. Cl.$^6$ ................................................. C01B 39/44
[52] U.S. Cl. ................................ 423/706; 423/DIG. 23; 502/77
[58] Field of Search .................. 423/706, 718, 423/DIG. 23; 502/77

[56] References Cited

U.S. PATENT DOCUMENTS

| | | | |
|---|---|---|---|
| 3,933,974 | 1/1976 | Winquist | 423/710 |
| 3,966,883 | 6/1976 | Vaughan et al. | 423/712 |
| 3,992,466 | 11/1976 | Plank et al. | 585/467 |
| 4,000,248 | 12/1976 | Martin | 423/707 |
| 4,016,245 | 4/1977 | Plank et al. | 423/708 |
| 4,017,590 | 4/1977 | Cormier et al. | 423/710 |
| 4,088,739 | 5/1978 | Vaughan et al. | 423/709 |
| 4,107,195 | 8/1978 | Rollmann | 556/173 |
| 4,205,053 | 5/1980 | Rollmann et al. | 423/703 |
| 4,251,499 | 2/1981 | Nanne et al. | 423/704 |
| 4,375,573 | 3/1983 | Young | 585/467 |
| 4,390,457 | 6/1983 | Klotz | 423/706 |
| 4,578,259 | 3/1986 | Morimoto et al. | 423/703 |
| 4,584,286 | 4/1986 | Valyocsik | 423/706 |
| 4,613,488 | 9/1986 | Van Erp et al. | 423/703 |
| 4,795,623 | 1/1989 | Evans | 423/706 |
| 4,797,266 | 1/1989 | Evans | 423/707 |
| 4,855,270 | 8/1989 | Maddad et al. | 423/706 |
| 4,925,548 | 5/1990 | Rubin | 423/706 |
| 4,942,027 | 7/1990 | Evans | 423/706 |
| 5,320,822 | 6/1994 | Ozin et al. | 423/700 |
| 5,449,851 | 9/1995 | Rahmin et al. | 585/671 |
| 5,463,160 | 10/1995 | Kuhlmann et al. | 585/671 |
| 5,785,947 | 7/1998 | Zones et al. | 423/705 |

FOREIGN PATENT DOCUMENTS

| | | |
|---|---|---|
| 0055529 A1 | 7/1982 | European Pat. Off. . |
| 0103981 A1 | 9/1982 | European Pat. Off. . |
| 0501577 A1 | 9/1992 | European Pat. Off. . |
| 0523838 A2 | 1/1993 | European Pat. Off. . |
| 1436524 | 5/1976 | United Kingdom . |

OTHER PUBLICATIONS

"Composition and Catalytic Properties of Synthetic Ferrierite," by C. L. Kibby, A. J. Perrotta, and F. E. Massoth, *Journal of Catalysis* 35, pp. 256–272 (1974) No Month.

Smith et al "Zeolite Synthesis in the $SiO_2$–$Al_2O_3$–$Na_2O$–Pyridine–$H_2O$ System" *J. Chem. Soc. Faraday Trans. I* (1989) 85(11) 3623–3628 (No Month).

*Primary Examiner*—Mark L. Bell
*Assistant Examiner*—David Sample

[57] ABSTRACT

Ferrierite is prepared by a method that provides extremely pure crystalline material. The method consists of preparing a mixture of silica, alumina, alkali metal and pyridine of a certain composition and heating said mixture to form the crystals. The $SiO_2/Al_2O_3$ and $OH^-/SiO_2$ are controlled to insure preparation of high $SiO_2/Al_2O_3$ ratio, high surface area and high purity ferrierite. An improved olefin skeletal isomerization catalyst is prepared from a high silica to alumina ratio, high surface area and high purity ferrierite.

9 Claims, 1 Drawing Sheet

FIG. 1  FIG. 2

PROCESS FOR PREPARING FERRIERITE

This is a continuation of application Ser. No. 08/782,858, filed Jan. 13, 1997, now abandoned, which is a continuation of application Ser. No. 08/481,724 filed Jun. 7, 1995, now abandoned.

FIELD OF INVENTION

This invention relates to a new method of preparing ferrierite of high $SiO_2/Al_2O_3$ ratio and high purity and improved olefin isomerization catalysts prepared from such ferrierite.

BACKGROUND OF THE INVENTION

Ferrierite is a crystalline aluminosilicate that has been found useful as an adsorbent, catalyst or catalyst support. The syntheses of ferrierite and ferrierite-type materials such as ZSM-35 are well known. See Journal of Catalysis, Vol. 35, 256–272 (1974) and U.S. Pat. Nos. 3,933,974; 3,966,883; 3,992,466; 4,016,245; 4,088,739; 4,107,195 and 4,251,499, among others.

Ferrierite can be prepared by heating aqueous mixtures of alkali and/or alkaline earth metal, alumina and silica. See U.S. Pat. Nos. 3,933,974, 3,966,883; 4,017,590 and 4,088,739.

These synthesis methods have several disadvantages. Typically, these synthesis methods require long periods of time and require elevated temperatures for synthesis. The high temperatures that promote crystallization require pressure vessels. The $SiO_2/Al_2O_3$ mole ratio of the product is relatively low, usually less than about 30 and the products exhibit surface areas of less than 350 $m^2/g$.

The use of organonitrogen compounds commonly called templates partially overcomes some of these difficulties. Shorter crystallization times and lower synthesis temperature result from using a variety of such templates. See U.S. Pat. Nos. 4,000,248; 4,107,195; 4,251,499; and 4,795,623, among others. Even these methods do not provide ferrierite of high $SiO_2/Al_2O_3$ ratio and purity that is desirable for many catalytic uses.

Many of the organic nitrogen compounds suggested as templates are expensive and are difficult to store and use. Many organic nitrogen compounds used in ferrierite synthesis have pKa values between 7–12 such as those disclosed in U.S. Pat. No. 4,205,053. Pyridine which has a pKa of 5.29 (See "Introduction to Organic Chemistry" by Andrew Streitweiser and Clayton H. Heathcock, published by Macmillan, New York, 1976). The use of pyridine in zeolite synthesis appears to be somewhat complicated. For example, U.S. Pat. No. 4,797,266 indicates that a preparation involving pyridine provides a mixture of zeolite ZSM-5 and ferrierite. U.S. Pat. No. 4,613,488 indicates use of pyridine or a derivative results in a novel aluminum silicate not ferrierite. U.S. Pat. No. 4,578,259 discloses the formation of "ISI-6" (an isotypic framework of ferrierite, See the Atlas of Zeolite Structure Types, by W. M. Meier and D. H. Olson, published by Butterworths-Heinemann, third revised edition, 1992, page 98) with the use of pyridine and "non-pyridine" nitrogen containing compounds or with pyridine and an oxygen containing compounds. According to U.S. Pat. No. 4,578,259, the use of pyridine alone does not result in the formation of ferrierite.

U.S. Pat. No. 4,251,499 teaches the use of piperidine and alkyl-substituted piperidines as a template. As a comparative example, the use of pyridine as a template in example 12 led to a product which contained 50% ferrierite, 30% other zeolitic material and 20% amorphous material.

EP-501,577-A1 relates to using a ferrierite catalyst in an olefin isomerization process. In example 2, it discloses a ferrierite catalyst having a molar silica to alumina of 72:1 prepared from a reaction gel with a molar composition of 93.5 $SiO_2/1.0$ $Al_2O_3/7.4$ $Na_2O/19.6$ $Na_2SO_4/30.0$ pyridine/1938 $H_2O$. In this example, the molar $OH^-/SiO_2$ ratio in the reaction gel was 0.16.

EP-523,838-A2 relates to using a ferrierite catalyst in an olefin isomerization process. In example 4, a ferrierite catalyst with a molar silica to alumina ratio of 87:1 having a surface area of 326 $m^2/g$ is disclosed.

It is an object of this invention to provide a process for the preparation of highly pure high molar silica to alumina ratio ferrierites having high surface areas which exhibit excellent catalytic performance when used in skeletal olefin isomerization.

SUMMARY OF THE INVENTION

Ferrierite powders of exceptional crystal phase purity with very high $SiO_2/Al_2O_3$ ratio can be prepared by forming an aqueous mixture of silica, alumina, alkali metal, and pyridine and heating said mixture until the aluminosilicate crystallizes. Various parameters must be controlled to provide the high ratio, high purity, high surface area material. The synthesis gel must contain a limited amount of alkali metal, the $OH^-/SiO_2$ mole ratio must be in a limited range and sufficient pyridine must be present to promote the reaction.

An important aspect of the process of our invention is that it provides ferrierite without forming other crystalline materials such as zeolite ZSM-5, mordenite, magadiite, various layered materials and quartz as impurities. Such impurities are common in the prior art synthesis methods when the preparation of high molar $SiO_2/Al_2O_3$ ratios are attempted. Further, a catalyst for structurally isomerizing a linear olefin of at least 4 carbon atoms to its corresponding methyl branched isoolefin containing the high molar silica to alumina ratio, high surface area ferrierite is provided. These catalysts exhibit higher selectivities at fixed conversions, greater run life and improved isobutylene yield in processing olefin rich streams compared to catalysts containing ferrierites with lower molar silica to alumina ratio and/or lower surface area prepared by earlier reported methods.

DESCRIPTION OF THE FIGURES

FIG. 1 was taken at 21,200× magnification.

FIG. 2 was taken at 21,200× magnification.

DETAILED DESCRIPTION OF THE INVENTION

Ferrierite

The process of our invention requires the preparation of a synthesis mixture of specific composition. Aqueous sources of silica, alumina, alkali metal, pyridine and optionally an acid or acid salt are used. The source of silica can be an alkali metal silicate, a silica sol or a readily soluble silica gel or precipitate. The alumina source can be sodium aluminate, aluminum sulfate or a combination of alumina and NaOH.

In addition to the alkali metal included with the silica and alumina sources, alkali metal hydroxides and alkali metal salts can be used. Mineral acids can be added if the alkaline nature of the synthesis mixture needs to be reduced. Pyridine is used as a crystal structure directing compound, often called a template. The synthesis mixture should have a molar composition as follows to provide the high molar silica to alumina ratio, high purity, high surface area product desired in the absence of seeding the synthesis mixture with ferrierite:

$Al_2O_3:60–500\ SiO_2:18–40\ pyridine:1.5–4\ M_2O:950–2000\ H_2O$ wherein M is an alkali metal, usually sodium.

If the synthesis mixture is seeded with ferrierite (as in Example 12 of the present invention), the molar composition of the synthesis mixture can range between:

$Al_2O_3:60–500\ SiO_2:10–40\ pyridine:1.5–4\ M_2O:950–2000\ H_2O$ wherein M is an alkali metal, usually sodium.

The amount of silica in the mixture must be relatively high to produce the high $SiO_2/Al_2O_3$ ratios desired. The amount of $M_2O$, usually $Na_2O$, must be limited as well. If the amount of alkali metal is too high, even if all the other conditions are maintained the product purity is reduced. An additional relationship is that the molar $OH^-/SiO_2$ must be between 0.05 and 0.15 when preparing product with molar $SiO_2/Al_2O_3$ ratios between 40:1 and 70:1, preferably between 50:1 to 70:1. If higher molar $SiO_2/Al_2O_3$ ratio products, greater than 70:1, are desired the $OH^-/SiO_2$ must be between 0.05 and 0.11. Therefore the molar $OH^-/SiO_2$ ratio of between 0.05 and 0.11 can be used to produce any ferrierite cyrstalline aluminosilicate of the invention having high purity, high surface area and having a molar silica to alumina ratio of greater than 40:1, preferably greater than 50:1. For the $OH^-/SiO_2$ ratio between greater than 0.11 to 0.15 only high purity, high surface area ferrierite having silica to alumina ratio of 70:1 or less can be produced. If there is less $OH^-$ present, the crystallization does not proceed well. If there is more $OH^-$ present, the ferrierite product is impure and much less useful for many catalyst applications such as skeletal olefin isomerization of light olefins such as butenes and pentenes.

The synthesis mixture is prepared by mixing the aqueous sources of reactants until relative homogeneity is attained. The mixture can be heated at once or aged for a period of time. Heating is carried out under pressure at about 140 to about 180° C. until crystallization is complete. The crystallization times can be about 12 to about 72 hours. These conditions differ from many of the earlier ferrierite synthesis methods in that the time required for crystallization is shorter and the temperature at which the crystallization occurs is much lower.

The addition of ferrierite to the synthesis mixture can be used to lower the amount of pyridine required and still obtain high molar silica to alumina ratio, high purity, high surface area ferrierite in 24 hours at 170° C. The type of ferrierite added to the synthesis mixture as seed ("seed ferrierite") is preferably high molar silica to alumina ratio, high purity, high surface area ferrierite made by the methods of this invention although other types of ferrierite can also be used as seed. Seeding the synthesis mixture with low purity ferrierite can result in an inferior ferrierite product and/or non-ferrierite contaminents such as those described earlier. The amount of ferrierite useful in seeding the synthesis mixture is an amount sufficient to assist in the nucleation and/or growth of the ferrierite structure. This amount can range from about 0.001 Wt %, preferably from about 0.1 Wt %, to about 50 Wt. %, preferably to about 10 Wt. %, of the anhydrous weight of the synthesis mixture.

Upon crystallization, the ferrierite is recovered. The ferrierite can be recovered by separating the ferrierite from the mother liquor by filtering or centrifuging, and then washing, drying (at a temperature of 100 to 200° C.) and optionally calcining at a temperature of above about 200° C.

The product is ferrierite that does not contain additional crystalline zeolite materials (no crystalline impurities). Ferrierite isotypic frame structure is the only crystalline phase present as determined by X-ray crystalline diffraction. See the *Atlas of Zeolite Structure Types,* by W. M. Meier and D. H. Olson, published by Butterworth-Heinemann, third revised edition, 1992, page 98. The prominent structural features of ferrierite isotypic frame structure found by x-ray crystallography are parallel channels in the alumino-silicate framework which are roughly elliptical in cross-section. Examples of such zeolites having the ferrierite isotypic framework structure include ferrierite (can be orthorhombic or monoclinic), Sr-D, FU-9 (EP B-55,529), ISI-6 (U.S. Pat. No. 4,578,259), NU-23 (E.P. A-103,981), ZSM-35 (U.S. Pat. No. 4,016,245) and ZSM-38 (U.S. Pat. No. 4,375,573). The term "essentially ferrierite crystalline phase" is used herein.

The ferrierite produced contains preferably more than about 50 moles, more preferably more than 60 moles, most preferably more than 65 moles, preferably to about 500 moles, more preferably to 200 moles of $SiO_2$ for each mole of $Al_2O_3$. The composition in the anhydrous state is preferably:

$1–3\ R:0.5–0.9\ M_2O:Al_2O_3:50–200\ SiO_2$ wherein R is pyridine and M is an alkali metal. The surface area is at least about 350 $m^2/g$, preferably at least about 370 $m^2/g$, to about 450 $m^2/g$. The ferrierite produced by this method typically have a platelet-like shape where in one dimension of the crystal is very small, on the average less than about 0.2 $\mu$m (thin), typically on the average about 0.1 $\mu$m, and the other two dimensions are much larger, an average of greater than about 0.6 $\mu$m to about 2 $\mu$m. The ferrierite made by our process is suitable as a catalyst or carrier in numerous hydrocarbon conversion processes such as catalytic dewaxing. It has been found that by using the ferrierite produced by this method, an improved skeletal olefin isomerization catalyst can be obtained.

Skeletal Olefin Isomerization Catalyst

The ferrierites synthesized in the present invention are preferably converted into ammonium ferrierite by ammonium ion-exchange and optionally followed by calcination to yield ferrierite in substantially its hydrogen form. See e.g., U.S. Pat. Nos. 4,251,499, 4,795,623, and 4,942,027 incorporated herein by reference. The term "hydrogen ferrierite" is used herein.

The isomerizing catalysts contain the ferrierite described above, optionally a binder and a coke-oxidation promoting metal such as palladium and/or platinum. For obtaining the higher selectivities at fixed conversions, greater run life and improved isobutylene yield in processing olefin rich streams, the catalyst is essentially ferrierite crystalline phase and contains more than about 50 moles, preferably more than 60 moles, most preferably more than 65 moles, to preferably 500 moles of $SiO_2$ for each mole of $Al_2O_3$ and the surface area is at least about 350 $m^2/g$, preferably at least about 370 $m^2/g$.

The ferrierite used in this invention may be combined with a refractory oxide that serves as a binder material. Suitable refractory oxides include natural clays, such as bentonite, montmorillonite, attapulgite, and kaolin; alumina; silica; silica-alumina; hydrated alumina; titania; zirconia and mixtures thereof. The weight ratio of zeolite to binder material suitably ranges from about 60:40 to about 99.5:0.5, preferably from about 75:25 to about 99:1 (anhydrous basis). Preferably the binder is an alumina.

Binders useful in preparing the catalysts can be silica or any of the conventional alumina-containing binders known in the art for preparing catalysts and include, for example, the aluminas, the silica-aluminas and the clays. For purpose of the invention, "alumina-containing binder" include any of the alumina precursors including the hydrated forms of alumina such as bayerite, boehmite and gibbsite which upon calcination are converted to alumina ($Al_2O_3$). Preferred silica-aluminas are the amorphous silica-aluminas such as the aluminosilicate gels and sols. Non-limiting examples of suitable clays include bentonite, hectorite, kaolin, and attapulgite. The binders are provided in any convenient form, such as powders, slurries, gels or sols. When the binders are provided as slurries, gels or sols, at least part of the water used in the mulling step will be found as part of the slurry, gel or sol.

Preferred binders are aluminas such as pseudoboehmite and gamma and bayerite aluminas. These binders are readily available commercially. LaRoche Chemicals, through its VERSAL® family of aluminas and Vista Chemical Company, through its CATAPAL® aluminas, provide suitable alumina powders which can be used as binders in preparing the instant catalysts. Preferred alumina binders to be used in the preparation of the catalyst, particularly when extrusion is utilized, are the high-dispersibility alumina powders. Such high-dispersibility aluminas, for example CATAPAL D, generally have a dispersibility of greater than 50% in a aqueous acid dispersion having an acid content of 0.4 milligram equivalents of acid (acetic) per gram of $Al_2O_3$.

The catalysts can be prepared by a variety of methods. In one embodiment, the ferrierite as herein defined is formed into pellets by compaction or extrusion with a binder and optionally a catalytic metal is added by impregnation of the pellet with a metals-containing solution. After impregnation the catalyst is calcined at elevated temperature. In another embodiment, ferrierite powder and alumina powder are mixed, (e.g., by mulling) with water and one or more compounds of the catalytic metal and the resulting mixture is formed into a pellet. Preferably the pellet is formed by compaction. When extrusion is used, a peptizing acid(s), such as nitric acid, acetic acid, citric acid or mixtures thereof, is added to the mixture and optional extrusion aids such as cellulose derivatives, e.g., METHOCEL® F4M hydroxypropyl methylcellulose, are utilized (manufactured by The Dow Chemical Company). The amounts of peptizing acid used are readily determined by routine experimentation and will be an amount that provides a plastic extrudable material. The term "pellets" as used herein can be any shape or form as long as the materials are consolidated. Examples of these shapes, (but not limited to) are shapes such as cylinders, bi-lobes, tri-lobes, tetra-lobes, gear shapes and spheres that may or may not be hollow.

The formed pellets are calcined at a temperature from a lower limit of from about 200° C., preferably from about 300° C., more preferably from about 450° C., to an upper limit of up to about 700° C., preferably up to about 600° C., more preferably up to about 525° C.

The mixture should be mixed thoroughly or vigorously until the mixture appears uniform. The mixing can be performed by combining all of the components of the mixture at once or by adding the components of the mixture at different stages of mixing. The mixing can be accomplished by mulling, i.e. mixing of powders to which sufficient water has been added to form a thick paste and wherein the mixing is accompanied by shearing of the paste. Commercially available mullers such as the Lancaster Mix Muller and the Simpson Mix Muller can be used to carry out the mixing. A commercial blender such as a ribbon blender, a high shear mixer and/or a powder mill can also be used to carry out the mixing.

Hydrocarbon Feed Stream

The hydrocarbon feed useful for this invention contains at least one linear olefin containing at least four, preferably four to ten, carbon atoms. Also considered a linear olefin for purposes of this invention is a compound containing a linear alkene segment with four to ten carbon atoms. It is believed that long chain linear alkenes and compounds containing long chain linear segments may penetrate the zeolite catalyst for a distance effective to allow isomerization. Thus, the entire molecule need not be small enough to fit entirely within the pore structure of the catalyst. The preferred feed contains butylene and/or amylene.

As used herein, n-butylene includes all forms of n-butylene, for example 1-butene and 2-butene, either trans-2-butene or cis-2-butene, and mixtures thereof. As used herein, n-amylene or n-pentene, includes 1-pentene, cis- or trans-2 -pentene, or mixtures thereof. The n-butylene or n-amylene used in the processes of this invention is generally in the presence of other substances such as other hydrocarbons. Thus, a feedstream used in the process of the invention containing n-butylene or n-amylene also can contain other hydrocarbons such as alkanes, other olefins, diolefins such as butadiene and pentadienes, napthenes, acetylenes, aromatics, hydrogen, and inert gases. Typically, the n-butene feedstream used in this invention contains about 10 to about 100 wt. % n-butene. For example, a fractionated hydrocarbon feedstream from a fluid catalytic cracking effluent stream generally contains about 20 to about 60 wt. % normal butene and a hydrocarbon effluent from an ethers processing unit, such as methyl-tert-butyl ether (MTBE) generally contains from 40 to about 100 wt. % n-butylene. Feed streams from steam crackers and catalyst crackers may also contain substantial amounts of alkanes, say, up to about 80 wt. %. Olefins obtained by selective hydrogenation of dienes, such as butadiene, may also be used.

As used herein, the term "olefin" can be alternatively referred to as "alkene"; the term "linear" can be alternatively referred to as "normal"; and the term "isoolefin" can be alternatively referred to as "methyl branched isoolefin." Similarly, butene and butylene refer to the same four carbon alkene; and pentene and amylene refer to the same five carbon alkene.

Isomerizing Conditions

In the processes of this invention, a hydrocarbon stream comprising at least one linear olefin is contacted with the catalytic zeolite under isomerizing conditions. Generally, the hydrocarbon stream is contacted with the above-described zeolite catalyst in a vapor phase at a suitable reaction temperature, pressure and space velocity. Generally, suitable reaction conditions include a temperature of about 200° C. to about 650° C., preferably from about 320° C. to about 600° C., an olefin partial pressure of above about 0.5 atmosphere, and a total pressure of about 0.5 to about 10.0 atmospheres or higher, a molar hydrogen to hydrocarbon ratio of 0 to about 30 or higher (i.e. the presence of hydrogen is optional), substantially free of water (i.e., less than about 2.0 wt % of the feed), and a hydrocarbon weight hourly space velocity (WHSV) of about 0.5 to about 100 $hr^{-1}$. These reactor streams can contain non-reactive diluents such as alkanes. The hydrogen can be added directly to the feed stream prior to introduction of the isomerization zone, or the hydrogen can be added directly to the isomerization zone.

The preferred reaction temperature will depend on a number of factors such as the pressure, the weight hourly space velocity and the feed composition. Lower molecular weight olefins such as butenes are best isomerized at a temperature of above 350° C. to 650° C. while higher molecular weight olefins are best isomerized at lower temperatures. Pentenes are best isomerized at a temperature form about 200° C. to 550° C., and hexenes are best isomerized at a temperature from about 200° C. to 500° C. Mixed butenes and pentenes are best isomerized at a temperature from about 200° C. to 600° C. and mixed pentenes and hexenes from about 200° C. to 525° C. The use of a lower temperature may be advantageous when the olefin is easily cracked to lighter unwanted species at higher temperatures. It is also possible to achieve higher concentrations of desired products at lower temperatures due to the fact that higher equilibrium concentrations of the branched olefins are possible at lower temperatures.

In a typical butene isomerization process scheme, a butene vapor stream is contacted with such catalyst in a reactor at about 320° C. to about 650° C., at an olefin partial pressure of about 5 psia to about 50 psia and a total pressure of about 15 to about 100 psia, and at an olefin based WHSV of about 0.5 to about 50 $hr^{-1}$. Preferred isomerizing conditions are carried out at a temperature of above 350° C. to about 450° C., at atmospheric pressure, and an olefin based WHSV of between about 2 to about 25 $hr^{-1}$, more preferably between about 2 to about 15 $hr^{-1}$.

In a typical pentene isomerization process scheme, a pentene vapor stream is contacted with such catalyst in a reactor at say about 250° C. to about 550° C., at an olefin partial pressure of about 3 psia to about 100 psia and a total pressure of about 15 to about 100 psia, and at an olefin based WHSV of about 1 to about 100 $hr^{-1}$. Preferred isomerizing conditions are carried out at a temperature of about 300° C. to 425° C. atmospheric pressure, and an olefin based WHSV of about 2 to about 40 $hr^{-1}$.

For a mixed feed, reaction conditions between pentene and butene isomerization processes can be used depending on the desired product mix.

EXAMPLES

The following examples illustrate certain embodiments of our invention. These examples are not provided to establish the scope of the invention, which is described in the disclosure and recited in the claims. The proportions are in parts by weight (pbw), percent by weight, moles or equivalents.

The x-ray diffraction patterns of the zeolites prepared in the examples were determined. The radiation was the K-alpha doublet of copper. The peak heights (I) and their position as a function of two-theta were read from a spectrometer chart. Theta is the Bragg angle. These readings were used to calculate relative intensities and interplanar spacings according to established practice. The results generated from the materials prepared as described in the examples were compared with the results generated from known samples of ferrierite. The crisp nature of the XRD spectra of ferrierite prepared by our method also indicates their phase purity.

The surface area of the ferrierite samples prepared by the methods of Examples 1–17 were determined by a modification of ASTM test method D3663-92. This method utilizes a modification of the gas adsorption technique of surface area measurement described by Brunauer, Emmett and Teller, (BET). Ferrierite samples that contained template were calcined in air at 500° C. for a period of 3 hours to remove the template before determining the surface area of the ferrierite samples. The samples were degassed by heating in vacuum at 350° C. to remove sorbed vapors. The samples were then cooled to liquid nitrogen temperature. The quantity of nitrogen adsorbed at low pressure is determined by measuring the pressure difference after the introduction of a fixed volume of nitrogen to the sample. Under these conditions, nitrogen is sorbed into zeolite micropores. The volumetric sorption measurement is measured at pressure levels of P/Po between 0.02 and 0.05. The magnitude of the nitrogen sorbed is calculated using the BET equation.

Example 1

This example illustrates the preparation of high molar silica to alumina ratio, high purity, high surface area ferrierite according to the present invention. 21.6 g of hydrated aluminum sulfate was dissolved in 1000.2 g of deionized water. To this solution was added 109.2 g of pyridine followed by 46.9 g of 97% sulfuric acid. This solution was mixed well before adding 472.2 g of sodium silicate with a composition of 28.7% $SiO_2$, 8.9% $Na_2O$, balance water. After mixing the resulting gel for 30 minutes, it was placed in a stirred autoclave and heated at 170° C. for 24 hours. The molar composition of the autoclave charge was:

1.0 $Al_2O_3$/2.7 $Na_2O$/60 $SiO_2$/1938 $H_2O$/36.7 pyridine

The $OH^-/SiO_2$ ratio of the charge was 0.09.

The resultant solid product was cooled to room temperature, separated from the liquid by filtration, washed with 33 ml of 150° F. water per gram of product and dried at 250° F. A portion of the product was subjected to x-ray analysis and was found to be pure ferrierite. After calcination at 1000° F. for 5 hours to remove the pyridine, the surface area of the product was determined to be 393 $m^2/g$. The product had a $SiO_2/Al_2O_3$ of 53 and contained 1.24% $Na_2O$, anhydrous.

The calcined product was then converted into the ammonium form of ferrierite by ion exchange with aqueous ammonium nitrate, (4 pounds of ammonium nitrate per pound of ferrierite). The ammonium ion exchange was conducted at 200° F. for a period of two hours. The ion exchanged product was separated from the liquid by filtration, washed with 3 gallons of 150° F. water per pound of ferrierite and dried at 250° F. The surface area of the product was determined to be 398 $m^2/g$. The dried ammonium exchanged product was analyzed and found to have a molar $SiO_2/Al_2O_3$ of 55:1 and contain 139 ppm $Na_2O$, anhydrous.

A portion of the dried ammonium exchanged ferrierite was pressed, crushed and sieved into 6–20 mesh particles. The 6–20 mesh particles were converted into the hydrogen form of ferrierite by calcination in flowing air at 500° C. for two hours.

Example 2

This is another example of the preparation of high molar silica to alumina ratio, high purity, high surface area ferrierite according to this invention. 21.0 g of hydrated aluminum sulfate was dissolved in 918.2 g of deionized water. To this solution was added 123.1 g of pyridine and 54.6 g of 97% sulfuric acid. After mixing this solution well, 533.5 g of sodium silicate (same composition as Example 1) were added. The resulting gel was mixed well for 30 minutes and charged to a stirred autoclave.

The autoclave was heated at 170° C. for 24 hours. The resulting solid product was cooled to room temperature, separated from the liquid by filtration, washed with 33 ml of 150° F. water per gram of product and dried at 250° F. A portion of the product was subjected to x-ray analysis and was found to be pure ferrierite. After calcination at 1000° F. for 5 hours to remove the pyridine, the surface area of the product was determined to be 392 m$^2$/g. The molar composition of the autoclave charge was:

1.0 Al$_2$O$_3$/3.15 Na$_2$O/70 SiO$_2$/1938 H$_2$O/42.8 pyridine

The OH$^-$/SiO$_2$ ratio of the charge was 0.09. The product had a SiO$_2$/Al$_2$O$_3$ ratio of 65.1 and contained 1.34% Na$_2$O, anhydrous.

Example 3

This example also illustrates the preparation of high molar silica to alumina ratio, high purity, high surface area ferrierite according to this invention. 23.1 g of hydrated aluminum sulfate was added to 722.0 g of deionized water and mixed until it dissolved. To this solution was added 86.6 g of pyridine and 81.8 g of 97% sulfuric acid. After good mixing of this solution, 736.4 g of sodium silicate (same composition as Example 1) was added and the resulting gel was mixed well for 30 minutes. The gel was charged to a stirred autoclave and heated at 150° C. for 72 hours. The molar composition of the autoclave charge was:

1.0 Al$_2$O$_3$/3.13 Na$_2$O/87.2 SiO$_2$/1661.5 H$_2$O/27.1 pyridine

The OH$^-$/SiO$_2$ ratio of the charge was 0.072.

The resulting solid product was cooled to room temperature, separated from the liquid by filtration, washed with 33 ml of 150° F. water/gram of product and dried at 250° F. A portion of the product was subjected to x-ray analysis and was found to be pure ferrierite. After calcination at 1000° F. for 5 hours to remove the pyridine, the surface area of the product was determined to be 391 m$^2$/g. The product had a SiO$_2$/Al$_2$O$_3$ ratio of 78.0 and contained 1.06% Na$_2$O, anhydrous.

The calcined product was then converted into the ammonium form of ferrierite by ion exchange with aqueous ammonium nitrate, (2 pounds of ammonium nitrate per pound of ferrierite). The ammonium ion exchange was conducted at 200° F. for a period of two hours. The ion exchanged product was separated from the liquid by filtration, washed with 3 gallons of 150° F. water per pound of ferrierite and dried at 250° F. The surface area of the product was determined to be 395 m$^2$/g. The dried ammonium exchanged product was analyzed and found to have a molar SiO$_2$/Al$_2$O$_3$ of 78:1 and contain 92 ppm Na$_2$O, anhydrous.

A portion of the dried ammonium exchanged ferrierite was pressed, crushed and sieved into 6–20 mesh particles. The 6–20 mesh particles were converted into the hydrogen form of ferrierite by calcination in flowing air at 500° C. for two hours.

Example 4

This is another example illustrating the preparation of high purity, high molar silica to alumina ratio, high surface area ferrierite according to this invention. 38.4 g of hydrated aluminum sulfate was dissolved in 1470.3 g of deionized water. To this solution was added 158.8 g of pyridine and 150.3 g of 97% sulfuric acid. This solution was mixed well before adding 1307.2 g of sodium silicate (same composition as Example 1). The resulting gel was mixed well for 30 minutes and placed in a stirred autoclave. The autoclave was heated at 150° C. for 72 hours. The resulting solid product was cooled to room temperature, separated from the liquid by filtration, washed with 33 ml of 150° F. water/gram of product and dried at 250° F. A portion of the product was subjected to x-ray analysis and was found to be pure ferrierite. After calcination at 1000° C. for 5 hours to remove the pyridine, the surface area of the product was determined to be 389 m$^2$/g. The molar composition of the autoclave charge was:

1.0 Al$_2$O$_3$/2.81 Na$_2$O/93.5 SiO$_2$/1938 H$_2$O/30 pyridine

The OH$^-$/SiO$_2$ ratio of the charge was 0.06. The product had a SiO$_2$/Al$_2$O$_3$ of 84.4 and contained 1.28% Na$_2$O, anhydrous.

Example 5

This is another example illustrating the preparation of high molar silica to alumina ratio, high purity, high surface area ferrierite according to the present invention. 20.5 g of hydrated aluminum sulfate was added to 914.1 g of deionized water and dissolved with mixing. To this solution was added 98.3 g of pyridine and 35.1 g of sodium hydroxide. 83.2 g of sodium sulfate was added to the solution and dissolved. After mixing well, 498.8 g of a 40% silica sol (composition 40% SiO$_2$, 0.5% Na$_2$O, balance water) was added. The resulting gel was mixed well for 30 minutes before placing it in a stirred autoclave. The autoclave was heated at 170° C. for 36 hours. The resultant solid product was cooled to room temperature, separated from the liquid by filtration, washed with 33 ml of 150° F. water/gram of product and dried at 250° F. A portion of the product was subjected to x-ray analysis and found to be pure ferrierite. After calcination at 1000° F. for 5 hours to remove the pyridine, the surface area of the product was determined to be 351 m$^2$/g. The molar composition of the autoclave charge was:

1.0 Al$_2$O$_3$/4.3 Na$_2$O/93.5 SiO$_2$/1938 H$_2$O/22.5 Na$_2$SO$_4$/30 pyridine The OH$^-$/SiO$_2$ ratio of the charge was 0.092. The product had a molar SiO$_2$/Al$_2$O$_3$ ratio of 77.2 and contained 1.64% Na$_2$O, anhydrous.

Example 6

This is an example illustrating the product formed when the present invention is not followed. 24.4 g of hydrated aluminum sulfate was dissolved in 757.8 g of deionized water. To this solution was added 92.9 g of 97% sulfuric acid and 91.0 g of pyridine. The solution was mixed well before adding 774.1 g of sodium silicate (same composition as Example 1). The resulting gel was mixed for 30 minutes and placed in a stirred autoclave. The autoclave was heated at 150° C. for 72 hours. The resultant solid product was cooled to room temperature, separated from the liquid by filtration, washed with 33 ml of 150° F. water/gram of product and dried at 250° F. A portion of the product was submitted to x-ray analysis and found to be amorphous. The molar composition of the autoclave charge was:

1.0 Al$_2$O$_3$/1.53 Na$_2$O/87.2 SiO$_2$/1661.5 H$_2$O/27.1 pyridine

The OH$^-$/SiO$_2$ ratio of this formulation was 0.035. This is below the range specified for the present invention.

Example 7

This is another example of the product formed when the present invention is not followed. 23.4 g of hydrated aluminum sulfate was dissolved in 747.5 g of deionized water. To this solution was added 71.1 g of 97% sulfuric acid and 87.5 g of pyridine. This solution was mixed well before adding 720.6 g of sodium silicate (same composition as Example 1). The resulting gel was placed in a stirred autoclave and heated at 150° C. for 72 hours. The resultant solid product was cooled to room temperature, separated from the liquid by filtration, washed with 33 ml of 150° F. water/gram of product and dried at 250° F. A portion of the product was submitted to x-ray analysis and found to contain some ferrierite contaminated with magadiite-like material (s). The molar composition of the autoclave charge was:

1.0 Al$_2$O$_3$/5.1 Na$_2$O/84.4 SiO$_2$/1661.5 H$_2$O/27.1 pyridine

The OH$^-$/SiO$_2$ ratio of this formulation was 0.12. This ratio is too high for the molar silica to alumina ratio used in this example.

Example 8

This is an example of the product resulting when the present invention is not followed. 20.5 g of hydrated aluminum sulfate was dissolved in 899.3 g of deionized water. To this solution was added 84.5 g of pyridine and 64.0 g of 50% sodium hydroxide. 81.5 g of sodium sulfate was then added to the well mixed solution. The mixture was agitated until the solids dissolved. Finally 500.3 g of 40% silica sol (same composition as Example 5) was added and the resulting gel was mixed for 30 minutes. The gel was placed in a stirred autoclave and heated at 170° C. for 36 hours. The resultant solid product was cooled to room temperature, separated from the liquid by filtration, washed with 33 ml. of 150° F. water/gram of product and dried at 250° F. A portion of the product was submitted to x-ray analysis and found to contain some ferrierite as well as quartz and other crystalline silica phases. After calcination at 1000° F. for 5 hours to remove the pyridine, the product had a surface area of 254 m$^2$/g. The molar composition of the autoclave charge was:

1.00 Al$_2$O$_3$/9.35 Na$_2$O/93.5 SiO$_2$/1938 H$_2$O/19.1 Na$_2$SO$_4$/30 pyridine The product had a SiO$_2$/Al$_2$O$_3$ of 65.8 and contained 2.23% Na$_2$O, anhydrous. The OH$^-$/SiO$_2$ ratio of this formulation was 0.2. This ratio is outside the range of the present invention.

Example 9

This is an example where ferrierite was prepared using piperidine instead of pyridine as template. 21.5 g of hydrated aluminum sulfate was dissolved in 995.3 g of deionized water. To this solution was added 116.8 g of piperidine and 46.5 g of 97% sulfuric acid. This solution was mixed well and 470.0 g of sodium silicate (same composition as in Example 1) was added. The resulting gel was mixed well for 30 minutes and placed in a stirred autoclave. The autoclave was heated at 170° C. for 36 hours. The resultant solid product was treated as described in the previous examples, and was found to be ferrierite contaminated with magadiite. The surface area of the product was 322 m$^2$/g. The molar composition of the autoclave charge was:

1.0 Al$_2$O$_3$/2.7 Na$_2$O/60 SiO$_2$/1938 H$_2$O/36.7 piperidine

The OH$^-$/SiO$_2$ ratio of the charge was 0.09. The product had a SiO$_2$/Al$_2$O$_3$ of 37.6 and contained 0.78% Na$_2$O, anhydrous. Contaminated ferrierite was produced in this example because piperidine was substituted directly for pyridine as the template in the formulation.

Example 10

This example follows the teachings of the present invention and describes a more efficient synthesis of high molar silica to alumina ratio, high purity, high surface area ferrierite. 78.5 g of hydrated aluminum sulfate was dissolved in 1235.4 g of deionized water. To this solution was added 166.5 g of 97% sulfuric acid and 1681.0 g of sodium silicate (same composition as in Example 1). The resulting gel was mixed well for 30 minutes before adding 208.6 g of pyridine followed again by 30 minutes of mixing. The final mix was placed in a stirred autoclave and heated at 170° C. for 24 hours. The molar composition of the autoclave charge was:

1.0 Al$_2$O$_3$/2.7 Na$_2$O/60 SiO$_2$/975 H$_2$O/19.7 pyridine

The OH$^-$/SiO$_2$ ratio of the charge was 0.09. The resultant solid product was treated as described in the previous examples and was found to be pure ferrierite with a surface area of 388 m$^2$/g. The product had a SiO$_2$/Al$_2$O$_3$ of 57:1 and contained 1.97% Na$_2$O, anhydrous.

The calcined product was then converted into the ammonium form of ferrierite by ion exchange with aqueous ammonium nitrate, (2 pounds of ammonium nitrate per pound of ferrierite). The ammonium ion exchange was conducted at 200° F. for a period of two hours. The ion exchanged product was separated from the liquid by filtration, washed with 3 gallons of 150° F. water per pound of ferrierite and dried at 250° F. The surface area of the product was determined to be 369 m$^2$/g. The dried ammonium exchanged product was analyzed and found to have a molar SiO$_2$/Al$_2$O$_3$ of 62:1 and contain 480 ppm Na$_2$O, anhydrous. The product had a n-hexane sorption capacity of 7.3 grams per 100 grams of zeolite.

A portion of the dried ammonium exchanged ferrierite was pressed, crushed and sieved into 6–20 mesh particles. The 6–20 mesh particles were converted into the hydrogen form of ferrierite by calcination in flowing air at 500° C. for two hours.

Example 11

This example follows the teachings of the present invention but shows that a certain minimum amount of pyridine is required to crystallize high ratio, high purity, high surface area ferrierite. 22.4 g of hydrated aluminum sulfate was dissolved in 1040.2 g of deionized water. To this solution was added 34.5 g of pyridine and 48.7 g of 97% sulfuric acid. This solution was mixed well. 491.0 g of sodium silicate (same composition as in Example 1) was added to the solution and the resulting gel was mixed well for 30 minutes. The gel was placed in a stirred autoclave and heated at 170° C. for 24 hours. The resultant solid product was treated as described in the earlier examples and was found to be amorphous. The molar composition of the autoclave charge was:

1.0 Al$_2$O$_3$/2.7 Na$_2$O/60 SiO$_2$/1938 H$_2$O/15.4 pyridine

The OH$^-$/SiO$_2$ ratio of the charge was 0.09.

Example 12

This example shows the effect of seeding the synthesis mix with crystalline ferrierite on preparation of high ratio, high purity, high surface area ferrierite following the teachings of the present invention. 23.1 g of hydrated aluminum sulfate was dissolved in 1046.4 g of deionized water. To this solution was added 49.0 g of pyridine and 37.3 g of 97% sulfuric acid with good mixing. 7.3 g of high ratio, high purity ferrierite prepared by the present invention was added to the solution and dispersed well. To this slurry was added 494.2 g of sodium silicate (same composition as in Example 1) and the resulting gel was mixed well for 30 minutes. The gel was placed in a stirred autoclave and heated at 170° C. for 24 hours. The resultant solid product was treated as described in the previous examples and was found to be high ratio, high purity ferrierite with a surface area of 419 m$^2$/g. The molar composition of the autoclave charge was:

1.0 Al$_2$O$_3$/2.7 Na$_2$O/60 SiO$_2$/1938 H$_2$O/12 pyridine

The OH$^-$/SiO$_2$ ratio of the charge was 0.09. The product had a SiO$_2$/Al$_2$O$_3$ of 57.2 and contained 1.93% Na$_2$O, anhydrous.

Example 13

This example describes an additional advantage of high ratio, high purity, high surface area ferrierite prepared according to the present invention. This product can be ion exchanged before calcination to remove the pyridine trapped in the zeolite. A 3 N NH$_4$NO$_3$ solution was prepared by dissolving 200 g of NH$_4$NO$_3$ in 833.3 g of deionized water. To this solution was added 205.3 g of a filter cake (LOI= 51.29%) of as-synthesized high ratio, high purity ferrierite made according to Example 10. The solids were dispersed well with good mixing and the slurry was heated at 200° F. for 2 hours. The resulting solid product was cooled to room temperature, separated from the liquid by filtration, washed with 25 ml of 150° F. water per gram of product and dried at 250° F. The elemental composition of the product was analyzed using atomic adsorption spectroscopy. The product had a SiO$_2$/Al$_2$O$_3$ of 61.6 and contained 270 ppm of Na$_2$O. After calcination at 1000° F. for 5 hours to remove the pyridine, the product had a surface area of 385 m$^2$/g.

Example 14

A sample of ammonium ferrierite was prepared by the methods outlined in U.S. Pat. Nos. 4,251,499, 4,795,623 and 4,942,027. The sample was pressed, crushed and sieved into 6–20 mesh particles. The particles were then calcined for two hours at 500° C. to produce a H-ferrierite catalyst with a surface area of 404 m$^2$/g and a molar silica to alumina ratio of 19:1.

Example 15

A sample of potassium/sodium ferrierite with a molar silica to alumina ratio of 16:1 was obtained from TOSOH Corporation. The material was ammonium ion-exchanged and converted into 6–20 mesh particles by the methods described above. The particles were then calcined for two hours at 500° C. to produce a catalyst with a surface area of 323 m$^2$/g and a molar silica to alumina ratio of 16:1.

Example 16

A sample of ammonium ferrierite was prepared by the methods outlined in Example 2 of EP-501,577-A1. The OH$^-$/SiO$_2$ ratio of the autoclave charge was 0.16. The ammonium ferrierite and was pressed, crushed and sieved into 6–20 mesh particles. These particles were then calcined for two hours at 500° C. to produce a hydrogen ferrierite (H-ferrierite) catalyst with a surface area of 326 m$^2$/g and a bulk molar silica to alumina ratio of 87:1. The sample contained about 5–10% non-ferrierite impurities after crystallization and washing. The concentration of these impurities was reduced (but not eliminated) upon the ammonium ion exchange and calcination of the sample.

Example 17

This example demonstrates the preparation of an extruded ferrierite catalyst useful in skeletal olefin isomerization.

A Lancaster mix muller was loaded with 645 grams of ammonium-ferrierite (5.4% LOI) prepared by the method outlined in Example 10 of this invention and 91 grams of CATAPAL® D alumina (LOI of 25.7%). The alumina was blended with the ferrierite for 5 minutes during which time 152 milliliters of de-ionized water was added. A mixture of 6.8 grams glacial acetic acid, 7.0 grams of citric acid and 152 milliliters of de-ionized water was added slowly to the muller in order to peptize the alumina. The mixture was mulled for 10 minutes. 0.20 Grams of tetraammine palladium nitrate in 153 grams of de-ionized water were then added slowly as the mixture was mulled for 5 additional minutes. Ten grams of METHOCEL® (R) F4M hydroxypropyl methylcellulose was added and the zeolite/alumina mixture was mulled for 15 additional minutes. The extrusion mixture had an LOI of 43.5%. The 90:10 zeolite/alumina mixture was transferred to the 2.25 inch Bonnot extruder and extruded using a stainless steel die plate with $\frac{1}{16}$" holes.

The extrudate was dried at 125° C. for 16 hours and then calcined in flowing air at a maximum temperature of 500° C. for two hours. The calcined extruded had a surface area of 364 m$^2$/g.

Skeletal Olefin Isomerization

A stainless steel tube, 1 inch OD, 0.6 inch ID and 26 inches long was used as a reactor. A thermowell extended 20 inches from the top of the tube. To load the reactor, it was first inverted and a small plug of glass wool was slid down the reactor tube over the thermowell until it hit the bottom of the tube. Silicon carbide (20 mesh) was added to a depth of about 6 inches. Over this was placed a small plug of glass wool. Approximately 4 grams of catalyst particles, 6–20 mesh, (or small extrudates) admixed with about 60 grams of fresh silicon carbide (60–80 mesh) were added in two parts to distribute the catalyst particles evenly. The catalyst bed was typically about 10 inches long. Another piece of glass wool was added to the top of the catalyst and the reactor was topped with 20 mesh silicon carbide, followed by a final plug of glass wool. A multipoint thermocouple was inserted into the thermowell and was positioned such that the temperature above, below and at three different places in the catalyst bed could be monitored. The reactor was inverted and installed in a temperature controlled furnace.

The feed utilized was 1-butene obtained from Scott Specialty Gases with a 1-butene content of greater than 99.2% weight. The 1-butene was fed to the reactor in the gas phase.

To start up the reactor, it was first heated to the desired operating temperature over a four hour period and held at the operating temperature for 2 hours, all under flowing nitrogen. After this pretreatment, the nitrogen flow was shut off and the 1-butene was added at a rate of 36 g/hr to give the desired weight hourly space velocity of 9.0 hr$^{-1}$. The reactor was operated at an outlet pressure of 3 psig and at a temperature of 430° C.

Regeneration

After running the catalysts in the isomerization process described above, they were found to be black due to the build-up of carbonaceous material (coke) comprising about 10 to 20% wt. Each catalyst was removed from the test reactor and its weight was measured. To demonstrate that the catalyst could be regenerated, two of the catalysts tested were reloaded separately into two test reactors and regenerated by the following procedure. Each reactor was pressurized to 90 psig and a flow of approximately 6 standard liters per hour of air was started. The samples were heated by the following controlled heating procedure: ramp from 25° C. to 125° C. at 10° C. per minute; hold at 125° C. for 30 minutes; ramp from 125° C. to 350° C. at 2° C. per minute; ramp from 350° C. to 470° C. at 1° C. per minute and hold at 470° C. for 24 hours. The reactors were then cooled and the regenerated catalysts were unloaded. Substantially complete regeneration of the catalysts was confirmed by the disappearance of the black color of the unregenerated catalysts. The catalyst was weighed to measure the coke loss.

Calculations

Conversion and selectivity are calculated for each sample during testing runs. Therefore the calculation of conversion and selectivity reflect the feed (FD) and effluent (EFF) concentrations of butene-1 (B1) and butene-2 (B2) and isobutylene (IB1). Conversion is calculated as:

$$\% \text{ Conversion} = \frac{(wt \% \text{ B1} + wt \% \text{ B2}) \text{FD} - (wt \% \text{ B1} + wt \% \text{ B2}) \text{EFF}}{(wt \% \text{ B1} + wt \% \text{ B2}) \text{FD}} \times 100$$

selectivity is calculated as:

$$\% \text{ Selectivity} = \frac{(wt \% \text{ IB1}) \text{ EFF} - (wt \% \text{ IB1}) \text{ FD}}{(wt \% \text{ B1} + wt \% \text{ B2}) \text{FD} - (wt \% \text{ B1} + wt \% \text{ B2}) \text{EFF}} \times 100$$

and yield is calculated as:

$$\% \text{ Yield} = \frac{(wt \% \text{ IB1}) \text{ EFF} - (wt \% \text{ IB1}) \text{ FD}}{(wt \% \text{ B1} + wt \% \text{ B2}) \text{FD}} \times 100$$

Table 1 shows the skeletal olefin isomerization performance results obtained in testing some of the catalysts prepared in the above examples. This table provides the hours of run life of the catalyst in the isomerization tests. "Run Life" (in hours) is defined herein as the time from the start-of-run to the time at which the concentration of methyl branched olefin in the product (isobutylene in these tests) has declined to 36 Wt. % after having reached its peak concentration. Some of the catalyst tested (Examples 14 and 15) never reached this high a concentration of isobutylene in the product. The catalysts of the present invention were able to achieve the longest run life. The long run life was maintained and sometimes increased upon regeneration of the catalyst.

In commercial operation, it may be desirable to let the catalyst operate until the product concentration declines to less than 20 Wt. % isobutylene in the product before regenerating the catalyst. A sample prepared by the methods described in Example 1 had a run life of 603 hours when allowed to run until the isobutylene content dropped to 20 Wt. % in the product. Longer run lives could also be achieved by operating at lower Weight Hourly Space Velocities, WHSV, of 1-butene. Increases in the run life can also be obtained by diluting the olefin content of the feedstock with less reactive gases often present in skeletal olefin isomerization feedstocks. Suitable diluent gases include propane, butanes, pentanes, nitrogen, hydrogen for example. These use of these gases serves to lower the partial pressure of the olefin to be isomerized and leads to higher reported selectivities to the branched olefin. Although the use of diluent gases can increase the run life and the selectivity to isobutylene of the catalysts of this invention, the presence of a diluent gas is not required to obtain longer run life and higher selectivities at fixed conversions than reported for non ferrierite catalysts of the type reported in German Specification No. 3,000,650-A and U.S. Pat. No. 5,043,523.

Table I also provides the selectivities of the various catalysts at 40% conversion, 45% conversion and 50% conversion and the highest concentration (weight percent) of isobutylene in the product during the testing.

As can be seen from Table 1, the catalysts of the present invention (Examples 1, 3 and 17), obtained the highest selectivities at fixed conversion levels and the highest isobutylene concentrations in the product when compared to samples with lower molar silica to alumina ratios (Examples 14, 15) and/or lower surface areas (Examples 15 and 16). Table 1 clearly shows the improvement in skeletal olefin isomerization performance obtained with catalysts made with high purity, higher molar silica to alumina ferrierite which exhibits high surface areas. The catalyst prepared by Example 3 obtained a selectivity to isobutylene of 95% at 40% conversion. Selectivities of almost 100% were obtained at slightly lower conversion levels with the catalyst of the present invention.

At 45% conversion Example 3 obtained 88% selectivity to isobutylene under the conditions of the testing. The catalysts prepared with lower molar silica to alumina ratio ferrierite (Examples 15 and 14) achieved 68% and 70% selectivities to isobutylene at 45% conversion. The catalyst of Example 16 which was made with a high molar silica to alumina ferrierite that had a surface area of 326 m$^2$/g achieved a selectivity to isobutylene of 79% at 45% conversion. The catalysts prepared by the present invention all exhibited selectivities to isobutylene of 83% or higher at 45% conversion.

The performance advantages of high purity, high molar silica to alumina ferrierite prepared by the present invention allowed extruded catalyst such as the one prepared in Example 17 to outperform the catalysts of Examples 14, 15 and 16 even when diluted with a binder such that it contains less total ferrierite, (Example 17). These performance advantages were maintained upon multiple regenerations of the ferrierite catalysts.

Figure 1:
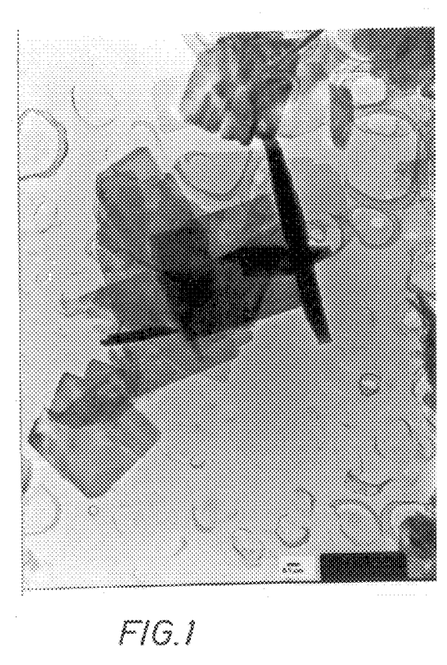
FIG. 1 is a Transmission Electron Microscopy (TEM), micrograph of the ferrierite produced by the methods of Example 1.

The crystalline ferrierite samples prepared in the Examples were analyzed by Transmission Electron Microscopy, TEM, and Scanning Electron Microscopy, SEM, at magnifications as high as 21,200×. FIG. 1 is a TEM micrograph of the ferrierite produced by the methods of Example 1. The micrograph was taken at 21,200× magnification. The ferrierite crystals of the present invention exhibit a well-defined platelet type of morphology wherein one dimension of the crystal has a mean average diameter of about 0.1 μm. The mean of the second largest diameter is about 0.8 μm and the mean of the largest diameter is about 1.1 μm. Some of the crystals prepared in Example 1 had a largest diameter of about 2 μm.

Figure 2:
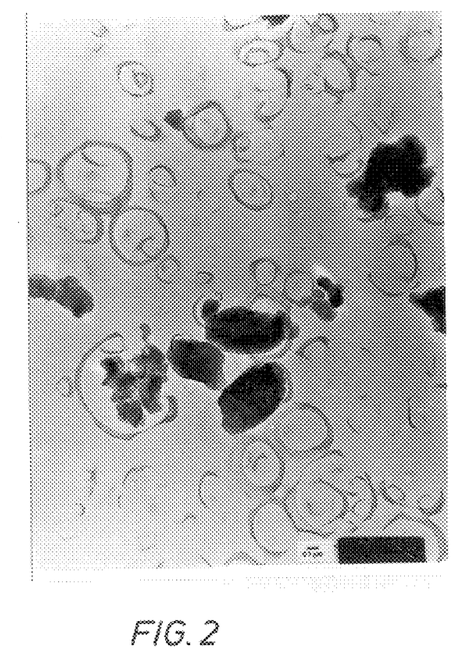
FIG. 2 is a Transmission Electron Microscopy (TEM), micrograph of the ferrierite prepared in accordance with Example 14.

The morphology of the ferrierite made in the present invention is different form that of the morphology of the ferrierite made in Example 14, which appears as smaller, more rounded and irregular crystals. FIG. 2 is a TEM micrograph of the ferrierite prepared by the methods of Example 14. The micrograph was taken at 21,200× magnification. The mean of the largest diameter of the ferrierite crystals made by Example 14 was about 0.4 μm. The second largest mean diameter of the ferrierite crystals produced by Example 14 was about 0.2 μm. Some of the crystals prepared by the methods of Example 14 were about 0.1 μm or less in all three dimensions.

The crystalline morphology of the ferrierite prepared in the present invention is also different from that of the microcrystalline ZSM-35 (a ferrierite isotype) prepared by the method of U.S. Pat. No. 3,992,466. The microcrystalline ZSM-35 is reported to exist as very small particles having diameters in the range of 0.005 μm to 0.1 μm.

The larger platelet like morphology of the crystals in the present invention, the high surface area and the high molar silica to alumina ratio of the ferrierite allow these high purity ferrierite catalysts to exhibit superior selectivity to isobutylene at fixed conversion levels when processing butylene containing feedstocks. These same ferrierite attributes allow the catalysts to work equally well with other C4–C10 olefin containing feedstocks.

of pyridine, said mixture having the following composition in moles:

$Al_2O_3$: 60–500 $SiO_2$: 10–40 R: 1.5–4 $M_2O$: 950–2000 $H_2O$ wherein R is pyridine, M is an alkali metal and said alkali metal source and silica source are such that there are 0.05 to 0.15 moles of $OH^-$ for each mole of $SiO_2$ to produce a ferrierite having silica to alumina ratio of 50 to 70 or there are 0.05 to 0.11 moles of $OH^-$ for each mole of $SiO_2$ to produce a ferrierite having silica to alumina ratio of greater than 70, b. heating said mixture at a temperature of about 140 to about 180° C. for a time sufficient to provide the ferrierite, and c. recovering the ferrierite.

2. The process of claim 1 wherein the mixture further comprises seed ferrierite in an amount sufficient to assist in the nucleation and/or growth of the ferrierite.

3. The process of claim 1 wherein the mixture is heated for a time within the range of about 12 to about 72 hours.

4. The process of claim 1 wherein the mixture is heated in an autoclave.

5. The process of claim 1 wherein the mixture further comprises an acid or an acid salt.

6. The process of claim 1 wherein the alkali metal source is from the silica source and/or alumina source.

7. The process of claim 1 wherein the alkali metal source is from alkali metal hydroxides and/or alkali metal salts.

8. The process of claim 1 wherein the mixture comprises in addition to the alkali metal included with the silica source and/or alumina source, alkali metal hydroxides or alkali metal salts.

TABLE 1

| EXAMPLE No. | MOLAR $SiO_2/Al_2O_3$ | SURFACE AREA ($m^2/g$) | % SELECTIVITY AT FIXED CONV. | | | RUN LIFE Hours | MAX. IB. Produced, % Wt. |
|---|---|---|---|---|---|---|---|
| | | | 50% Conv. | 45% Conv. | 40% Conv. | | |
| 15 | 16 | 323 | 63 | 68 | 73 | (a) | 32.5 |
| 14 | 19 | 404 | 65 | 70 | 75 | (b) | 33.0 |
| 1 | 55 | 398 | 77 | 86 | 91 | 233 | 39.1 |
| 1(c) | 55 | 398 | 78 | 87 | (d) | (e) | 39.9 |
| 17 | 62 | 364 | 74 | 83 | 88 | 142 | 38.2 |
| 17(f) | 62 | 364 | 74 | 83 | 88 | 144 | 38.2 |
| 3 | 78 | 395 | 77 | 88 | 95 | 233 | 39.9 |
| 16 | 87 | 326 | 69 | 79 | 87 | 75 | 36.2 |

(a) Did not ever achieve 36% Wt. isobutylene in the product; maximum was 32.5% Wt.
(b) Did not ever achieve 36% Wt. isobutylene in the product; maximum was 33.0% Wt.
(c) Sample was "run and then regenerated" twice before this test.
(d) The run was terminated when the conversion had dropped to 43.4%.
(e) Terminated run before the product IB concentration had declined to 36.0% Wt. The run was stopped with a product IB concentration of 38.9% Wt. after 241.3 hours on stream.
(f) This extruded sample was "run and then regenerated" twice before this test.

We claim:

1. A method of preparing a ferrierite crystalline aluminosilicate comprising:

a. preparing a mixture comprising an alkali metal source, silica source, alumina source and a template consisting 9. The process of claim 1 wherein the mixture contains 0.05 to 0.11 moles of $OH^-$ for each mole of $SiO_2$ to produce a ferrierite having silica to alumina ratio of greater than 70.

* * * * *